Jan. 18, 1966     H. K. CYMARA     3,229,320
LEAF BALER
Filed May 28, 1964     3 Sheets-Sheet 1
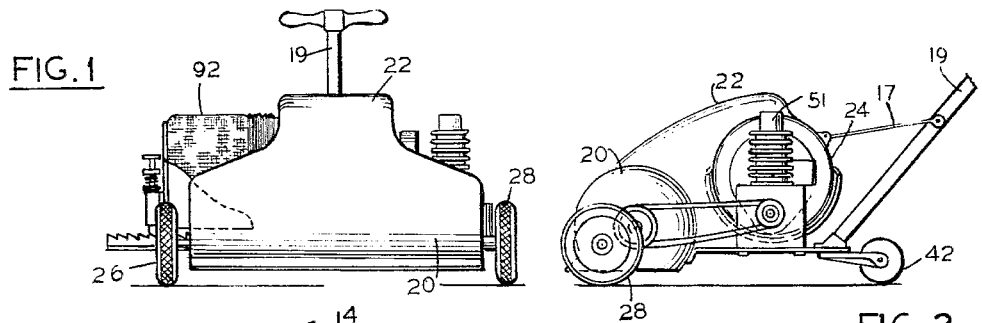
FIG. 1
FIG. 2
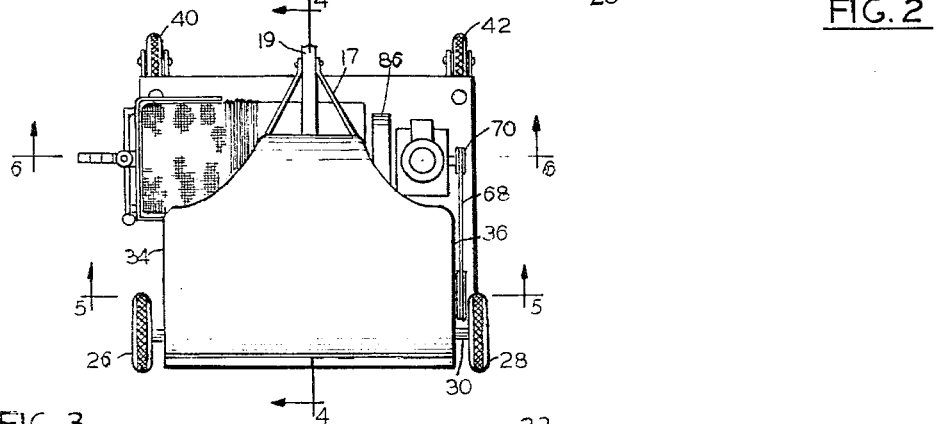
FIG. 3
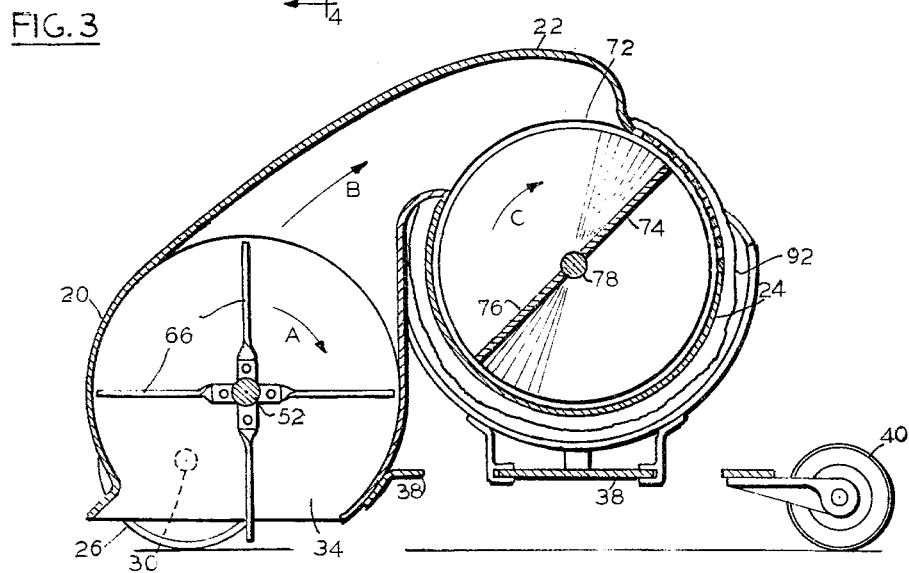
FIG. 4
INVENTOR.
HERMANN K. CYMARA
BY *F. P. Keeper*
ATTORNEY

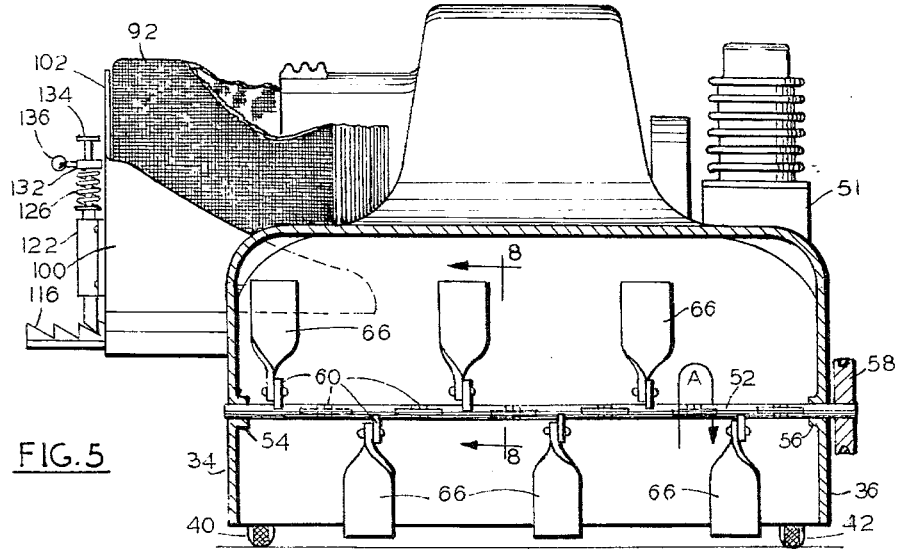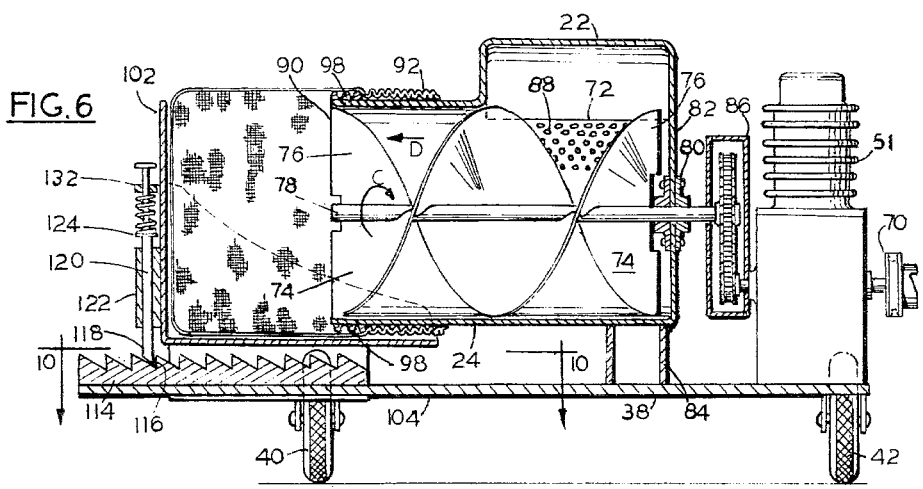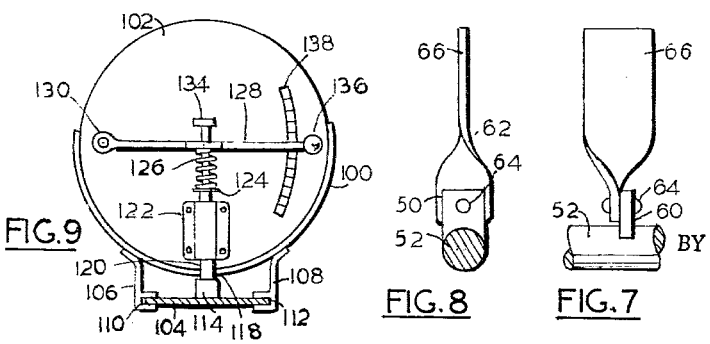

Jan. 18, 1966        H. K. CYMARA        3,229,320
LEAF BALER
Filed May 28, 1964        3 Sheets-Sheet 3
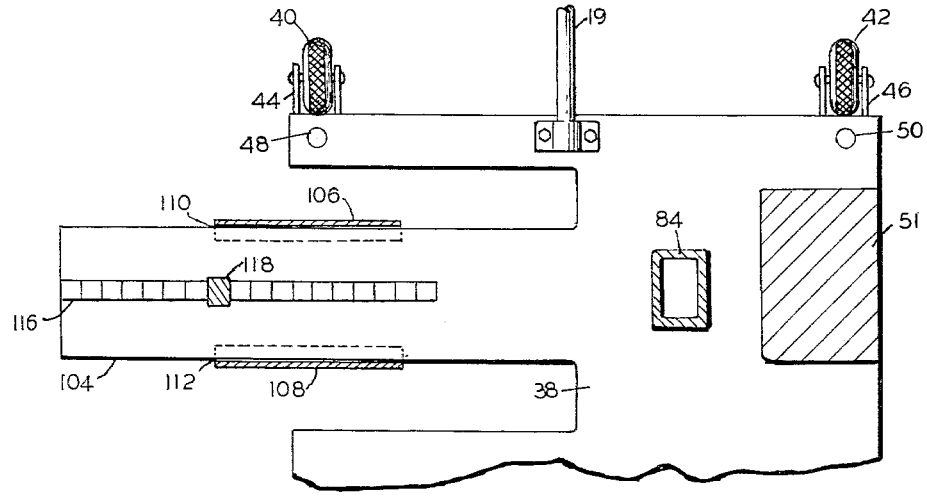
FIG. 10
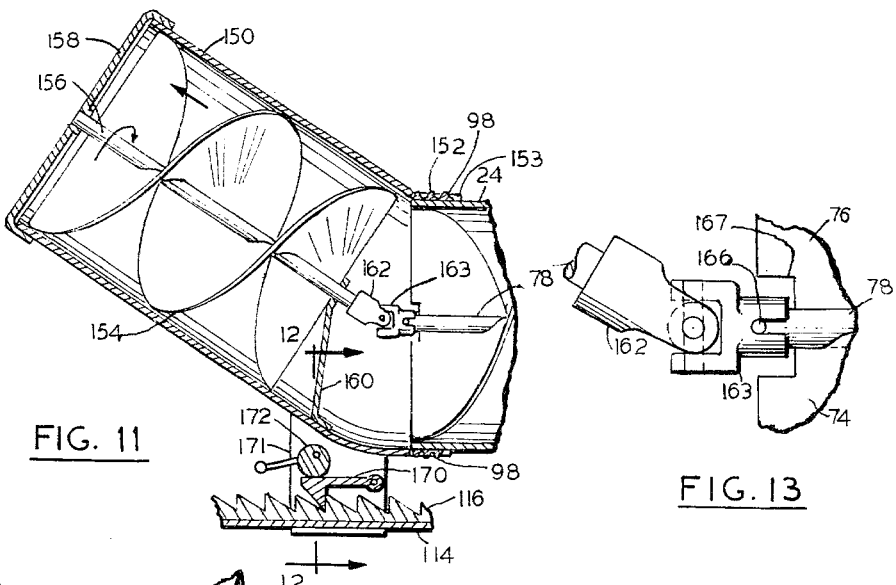
FIG. 11
FIG. 13
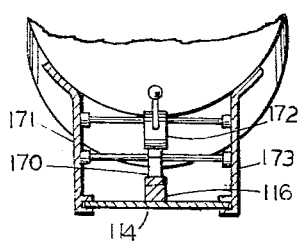
FIG. 12
INVENTOR.
HERMANN K. CYMARA.
BY *J. P. Kerper*
ATTORNEY 3,229,320
LEAF BALER
Hermann K. Cymara, R.D. 2, Newfield, N.Y.
Filed May 28, 1964, Ser. No. 370,909
2 Claims. (Cl. 15—348)

This invention relates primarily to lawn sweepers, and more particularly to a lawn sweeper having leaf bagging apparatus and capable of conversion for snow removal.

Lawn sweepers for collecting leaves generally include sweeping mechanism for lifting the leaves and discharging the same loose into a hamper. Such hampers are bulky and require frequent dumping of a load that is relatively light.

The present invention is directed to a lawn sweeper wherein the leaves are collected by power and discharged into a compacting chamber, which discharges the leaves in compacted form into bags, which due to the compacting of the leaves, hold a substantial quantity. Thus frequent changing of hampers or bags is avoided; the leaves within the bag may be stored for future use. The necessity for frequent dumping into a loose pile which are susceptible to scattering by the wind is avoided. Such loose piles of leaves are attractive nuisances to young folk who likewise cause scattering. By employing a plurality of inexpensive mesh bags, an entire lawn may be swept, and the leaves retained in compacted form within the bags for future disposal.

More particularly the invention employs, in conjunction with a sweeper, a compacting device in the form of a power driven compacting worm, within a tube having an open discharge end, over which a bag may be slipped. Provision is made for measured resistance to the filling of the bag, in order to effect compacting of the leaves, so that a large quantity of leaves may be collected in but a few bags. Additionally provision is made for utilizing the apparatus for snow removal.

The above and other novel features of the invention will appear more fully hereinafter from the following detailed description when taken in conjunction with the accompanying drawings. It is expressly understood that the drawings are employed for purposes of illustration only and are not designed as a definition of the limits of the invention, reference being had for this purpose to the appended claims.

In the drawings wherein like reference characters indicate like parts:

FIGURE 1 is a front elevational view of the sweeper;
FIGURE 2 is a side elevational view;
FIGURE 3 is a top plan view;
FIGURE 4 is an enlarged sectional view taken on the line 4—4 of FIGURE 3;
FIGURE 5 is an enlarged sectional view through the sweeper, taken substantially on the line 5—5 of FIGURE 3;
FIGURE 6 is a fragmentary detailed side view of a sweeper blade taken on the line 6—6 of FIGURE 3;
FIGURE 7 is a fragmentary detailed front view of a sweeper blade;
FIGURE 8 is a sectional view through the compacting apparatus, taken on the line 8—8 of FIGURE 5;
FIGURE 9 is an end view of the compacting apparatus;
FIGURE 10 is a fragmentary sectional view taken on the line 10—10 of FIGURE 6, showing the base beneath the compactor;
FIGURE 11 is a fragmentary sectional view of a snow removal assembly for use with the apparatus;
FIGURE 12 is a fragmentary end view of the support for the assembly of FIGURE 11; and
FIGURE 13 is an enlarged view of the universal coupling for driving the assembly of FIGURE 11.

Referring to the drawings, in FIGURES 1–3 there is shown the leaf bagging apparatus, which comprises a forward leaf harvester located within a forward cylindrical leaf collecting housing 20, having a discharge duct 22 leading to a transverse delivery cylinder 24 disposed behind and above the collecting housing and having a worm or feed screw for sidewise delivery and leaf compacting. Forward ground wheels 26 and 28 are pivoted on stub axles 30 and 32 secured to the circular end members 34 and 36 of the leaf collector housing 20. Extending rearwardly from the leaf collecting housing is a bed plate 38, which together with the housing form a frame. The bed plate extends rearwardly beneath the leaf compactor and beneath the bed plate are swung rear wheels 40 and 42 which may be of the caster type and pivoted in forked frames 44 and 46, the frames being pivoted as at 48 and 50 to the bed plate 38. A handle 19 for pushing the apparatus extends from the plate 38, and is braced as at 17 from the cylinder 24. Mounted on the bed plate, and behind one end of the leaf collector is a small gasoline engine 51 of about 3 horsepower. Within the leaf collector housing, there is provided a transverse shaft 52 journalled in end bearings 54 and 56 mounted in the end housing members 34 and 36. The shaft extends through the bearing 56, and a pulley 58 is provided on the end. The shaft 52 is provided with a series of radial lugs 60 disposed at equally spaced intervals along the shaft, adjacent lugs being disposed at 90° from each other, progressively along the shaft, in a helical fashion from one end of the shaft to the other. Each of the lugs is provided with a paddle like blade which may comprise a shank portion 62 pivoted as at 64 to each respective lug, and a twisted paddle portion 66, lying in the plane of the shaft axis and adapted to sweep just inside of the cylindircal housing 20, when redially extended by centrifugal force. Rotation of the leaf collector paddles is in the direction of arrows A, and the shaft pulley may be belt driven at relatively high speed as at 68 from the pulley 70 on the engine 51.

The rotating paddles deliver leaves and throw the same tangentially in the direction of arrow B, into an opening 72 in the top, at one end of the compacting cylinder 24, as seen in FIGURE 4, the tangential discharge duct 22 narrowing down to concentrate the flow of leaves into the end of the compacting cylinder 24. Within the compacting cylinder is a two thread worm for delivering the leaves to the left as shown in FIGURE 6, the worm rotating in the direction of arrow C, to move the leaves to the left, in the direction of arrow D. The two helical blades 74 and 76 of the worm are mounted on a shaft 78 that is journalled at 80 in the end wall 82 of the cylinder 24. The cylinder is supported at one end upon a heavy pillar 84 affixed to the bed plate 38, and the worm is driven at a relatively slow speed through a chain reduction gear 86, from the shaft to the engine 51. The back wall of the cylinder 24 adjacent below the duct 22 may be provided with a multiplicity of air escape apertures as indicated at 88. The open end 90 of the cylinder is adapted to receive a mesh bag 92 of an overall circumference sufficient to readily slide over the end of the cylinder 24. The bottom of the empty bag is brought up to the open end 90 of the cylinder, and its girth pulled over the cylinder end and the open end of the bag is accumulated bellows like, as at 92, over the free end of the cylinder 96. One or more toothed rubber blocks such as 98, are applied to the exterior of the cylinder adjacent its open end, to engage the mesh of the bag and afford resistance to movement of the bag bottom away from the end of the worm blades 74 and 76.

A bag support in the form of an arcuate apron 100, having a circular end plate 102 is provided, the same being slidably supported on a tongue portion 104 of the bed plate 38, spaced uprights 106 and 108, with guide channels 110 and 112 slidably riding on the side edges of the tongue, being provided. In order to resist lateral movement of the apron 100 and end plate 102, resulting from the collecting and compacting of leaves within the bag by the worm blades 74 and 76, there is provided a ratchet for 114 affixed to the tongue 104 having a plurality of inclined teeth 116, upon which a spring pressed tooth 118 rides, the tooth being slidably supported on the backside of the plate 102. Such tooth may have a shank portion 120 slidably housed in a guide 122 on the lower end of the side of the plate 102. The shank may be provided with an annular compression spring shoulder 124, and a compression spring 126 threaded on the shank. A release, and spring pressure adjusting lever 128, pivoted at one end at 130 to the plate 102, has an aperture 132 through which the shank 120 extends, and an end flange 134. The free end of the lever 128 has a knob 136, and is adapted to be held in any one of a number of angular positions by engagement with the ratchet sector 138 to vary the spring pressure on the tooth 118, or to release the same for removal.

The apparatus may be modified to operate as a snow removal device, by releasing the spring 126, and removing the bag holder 100 and 102, and replacing it with the discharge chute appaartus shown in FIGURE 11. The inclined discharge chute 150, circular in cross section, is provided with an horizontal tubular portion 152 adapted to telescope over the compactor cylinder 24, the same being slotted at 153 to accommodate the blocks 98. The duct has a two bladed worm 154 on a shaft 156, which is journalled at its opposite ends in narrow bearing brackets or arms 158 and 160. The shaft is provided with a universal joint 162 having a sleeve 163 adapted to fit over the end of shaft 78, such sleeve having diametrally opposed slots 164 engaging a transverse pin 166 in the end of the shaft 78 for drive. The ends of the blades 74 and 76 are cutaway to receive the sleeve as at 167. The chute 150 is supported from the tongue 114, on which it is slid, by bracket arms 171 and 173, and the pivoted dog 170 is adapted to engage between two of the teeth 116, and when backed up by the hand lever operated cam 172, the chute assembly is locked in place.

It will be seen that the rotary paddles will sweep and blow the leaves or snow in the direction of arrow B, into the collector cylinder, which serves to move the material to the left, either into a mesh bag 92, or into the inclined chute 150. In the case of leaves the worm compacts the leaves as it fills the bag, and causes the bag to slowly move against the resistance of the tooth 118 upon the inclined faces of the teeth 116. Any degree of resistance can be set so as to compact the leaves to the degree desired.

While a single modification of the invention with a variation thereof has been illustrated and described, it is to be understood that the invention is not limited thereto. As various changes in the construction and arrangement may be made without departing from the spirit of the invention, as will be apparent to those skilled in the art, reference will be had to the appended claims for a definition of the limits of the invention.

What is claimed is:
1. In collecting apparatus of the type described, a frame having ground wheels, said frame including a forwardly disposed transversely extending open bottom cylindrical collector housing and a bed plate extending rearwardly of the housing, a shaft journalled in said housing having a plurality of radial paddles, a delivery cylinder having one end closed and the other end open and disposed behind the collector housing, said cylinder being offset with respect to said housing, means for supporting the closed end portion of said cylinder from said bed plate, a discharge duct leading from the central upper portion of the collector housing to the upper side of the closed end portion of the cylinder, a helical two blade feed screw journalled in the closed end of said cylinder for effecting lengthwise movement of material delivered thereto from said duct toward the open end of the cylinder, power means for driving said paddle shaft and said feed screw mounted on said bed plate behind one end of said housing and to one side of said cylinder, means for holding a bag telescopically over the open end portion of said cylinder, a bag support having an upright plate for engaging a bag bottom when disposed over the open end of said cylinder, means slidable laterally on said bed plate for supporting said bag support, and means for resisting movement of said bag support in a direction away from the open end of said cylinder.

2. In collecting apparatus of the type described a frame having ground wheels, said frame including a forwardly disposed transversely extending open bottom cylindrical collector housing and a bed plate extending rearwardly of the housing, a shaft journalled in said housing having a plurality of radial studs disposed along and around the shaft, radial paddles pivoted to said studs and lying in the plane of the shaft axis, a delivery cylinder having one end closed and the other end open and disposed behind the collector housing, said cylinder being offset with respect to said housing, means for supporting the closed end portion of said cylinder from said bed plate, a discharge duct leading from the central upper portion of the collector housing to the upper side of the closed end portion of the cylinder, said cylinder having air relief ports in the closed end portion wall behind said duct, a helical two blade feed screw journalled in the closed end of said cylinder for effecting lengthwise movement of material delivered thereto from said duct toward the open end of the cylinder, power means for driving said paddle shaft and said feed screw mounted on said bed plate behind one end of said housing and to one side of said cylinder, means for holding a mesh bag telescopically over the open end portion of said cylinder, a bag support having an upright circular plate for engaging a bag bottom when disposed over the open end of said cylinder, means slidable laterally on said bed plate for supporting said bag support, saw tooth cam means for resisting movement of said bag support in a direction away from the open end of said cylinder, and means for varying the degree of resistance to movement of said bag support.

References Cited by the Examiner
UNITED STATES PATENTS

| | | | |
|---|---|---|---|
| 535,892 | 3/1895 | Davis | 100—229 X |
| 1,207,816 | 12/1916 | Thompson | 15—348 X |
| 2,390,286 | 12/1945 | Adams | 37—45 X |
| 2,508,829 | 5/1950 | Lamy | 37—43 X |
| 2,514,945 | 7/1950 | Fortier | 15—84 X |
| 3,132,429 | 5/1964 | Etnyre | 37—45 |
| 3,159,958 | 12/1964 | Mathews | 56—501 X |

FOREIGN PATENTS

| | | |
|---|---|---|
| 963,580 | 1/1950 | France. |

ROBERT W. MICHELL, *Primary Examiner.*